United States Patent
Soni et al.

(10) Patent No.: US 11,704,897 B2
(45) Date of Patent: *Jul. 18, 2023

(54) LANE COUNT ESTIMATION

(71) Applicant: HERE Global B.V., Eindhoven (NL)

(72) Inventors: Abhilshit Soni, Gujarat (IN); Akshay Pachaar, Haryana (IN)

(73) Assignee: HERE Global B.V., Eindhoven (NL)

(*) Notice: Subject to any disclaimer, the term of this patent is extended or adjusted under 35 U.S.C. 154(b) by 52 days.

This patent is subject to a terminal disclaimer.

(21) Appl. No.: 17/322,310

(22) Filed: May 17, 2021

(65) Prior Publication Data

US 2021/0271900 A1 Sep. 2, 2021

Related U.S. Application Data

(63) Continuation of application No. 16/238,384, filed on Jan. 2, 2019, now Pat. No. 11,023,746.

(51) Int. Cl.
*G06K 9/00* (2022.01)
*G06V 10/762* (2022.01)
*G06V 20/56* (2022.01)

(52) U.S. Cl.
CPC ............ *G06V 10/763* (2022.01); *G06V 20/56* (2022.01); *G06V 20/588* (2022.01)

(58) Field of Classification Search
None
See application file for complete search history.

(56) References Cited

U.S. PATENT DOCUMENTS

| | | |
|---|---|---|
| 6,385,539 B1 | 5/2002 | Wilson et al. |
| 2013/0194424 A1 | 8/2013 | Furusawa et al. |
| 2016/0167582 A1 | 6/2016 | Chen et al. |
| 2019/0095723 A1 | 3/2019 | Tsuchiya et al. |

FOREIGN PATENT DOCUMENTS

WO 2010147730 A1 12/2010

OTHER PUBLICATIONS

Chen et al., Probabilistic Modeling of Traffic Lanes from GPS Traces, Acm GIS'10, Nov. 2-5, 2010, 8 pages.
Chen, Chen, et al. "City-Scale Map Creation and Updating Using GPS Collections." Proceedings of the 22nd ACM SIGKDD International Conference on Knowledge Discovery and Data Mining. Aug. 13, 2016. (pp. 1465-1474).
Eriac Manel, "Probabilistic Estimation of Lanes Using Vehicle GPS Trajectories", Master of Philosophy (Electronics & Telecommunications Engineering), Feb. 22, 2015, (Abstract).
European Search Report for European Patent Application No. 20150123.6-1207 dated May 8, 2020.
(Continued)

*Primary Examiner* — Soo Jin Park
(74) *Attorney, Agent, or Firm* — Lempia Summerfield Katz LLC

(57) ABSTRACT

A method for assigning a number of lanes and a direction of travel on a path includes receiving location data including a plurality of location points, projecting the plurality of location points on to an aggregation axis perpendicular to a centerline of the vehicle path, grouping the plurality of location points as projected onto the aggregation axis into one or more clusters, and determining the number of vehicle lanes of the vehicle path based on a count of the one or more clusters.

20 Claims, 11 Drawing Sheets

(56) References Cited

OTHER PUBLICATIONS

Revilloud et al., "An improved approach for robust road marking detection and tracking applied to multi-lane estimation", 2013 IEEE Intelligent Vehicles Symposium (IV) (Year: 2013).
Schroedl, et al., "Mining GPS Traces for Map Refinement", Data Mining and Knowledge Discovery, 9, 59-87, 2004.
Fang et al., "Lane-Level Road Information Mining from Vehicle GPS Trajectories Based on Naïve Bayesian Classification", ISPRS Int. J. Geo-Inf. 2015, 4, 2660-2680.
Uduwaragoda et al., "Generating Lane Level Road Data from Vehicle Trajectories Using Kernel Density Estimation", Proceedings of the 16th International IEEE Annual Conference on Intelligent Transportation Systems (ITSC 2013), The Hague, The Netherlands, Oct. 6-9, 2013.
European Office Action from Patent Application No. 20150123.6-1207, dated Mar. 7, 2022, 9 pages.

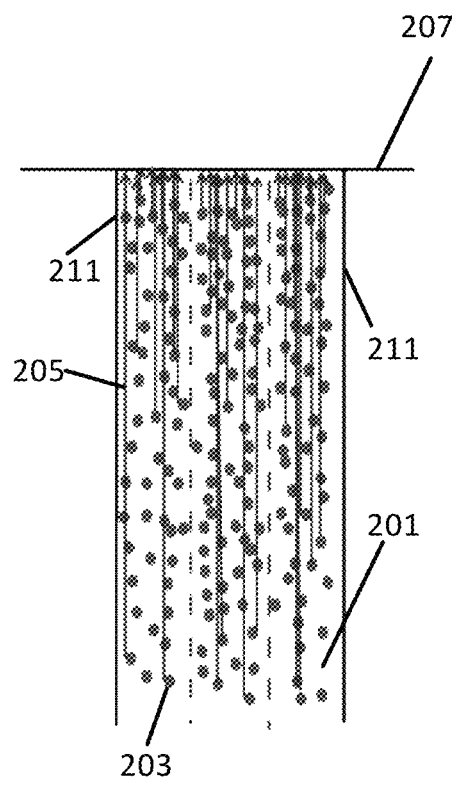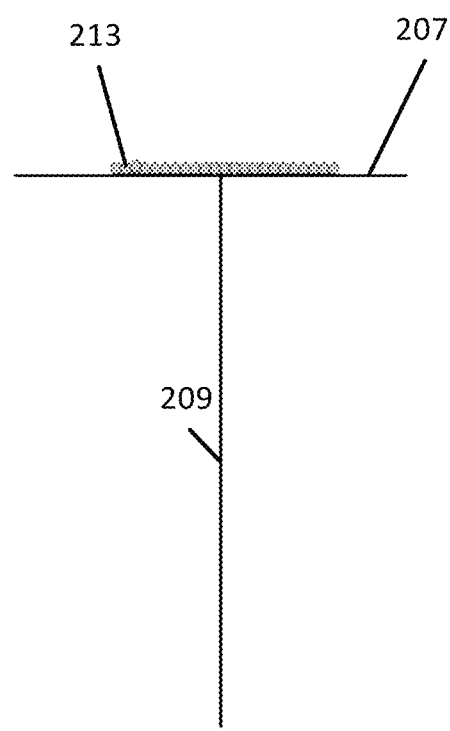
FIG. 2A                    FIG. 2B

LANE COUNT ESTIMATION

CROSS-REFERENCE TO RELATED APPLICATIONS

This application is a continuation of U.S. patent application Ser. No. 16/238,384 entitled "LANE COUNT ESTIMATION," filed on Jan. 2, 2019, the entire disclosure of which is hereby incorporated by reference.

FIELD

The following disclosure relates to a system for estimating a number of lanes on a road or vehicle path.

BACKGROUND

A map or navigation database may contain attributes about roads or vehicle paths, including a number of lanes of vehicle traffic. The number of lanes may be used to generate a navigation command. The navigation command or the number of lanes may be sent to a user (e.g. to a user's mobile device) or to a vehicle.

The number of lanes for the road or vehicle path may be determined based on top-down images of the road or path. For example, satellite imagery of roads and paths may be manually reviewed to count the number of lanes present. Additionally or alternatively, images taken from street level may be reviewed to count the number of lanes. Manual counting of vehicle lanes may be time consuming and limited by the resolution of the reviewed images. In some cases, machine learning may be applied to the images to count the lanes.

SUMMARY

In one embodiment, a method for assigning a number of vehicle lanes on a vehicle path is disclosed. The method includes receiving location data including a plurality of location points, projecting the plurality of location points on to an aggregation axis perpendicular to a centerline of the vehicle path, grouping the plurality of location points as projected onto the aggregation axis into one or more clusters, and determining the number of vehicle lanes of the vehicle path based on a count of the one or more clusters.

In another embodiment, an apparatus for assigning a number of vehicle lanes on a vehicle path is disclosed. The apparatus includes a receiver configured to receive location data including a plurality of location points, an aggregator configured to project the plurality of location points on to an aggregation axis perpendicular to a centerline of the vehicle path and group the plurality of location points as projected onto the aggregation axis into one or more clusters, and a geographic data processor configured to determine the number of vehicle lanes of the vehicle path based on a count of the one or more clusters.

In another embodiment, a non-transitory computer-readable medium is disclosed that includes instructions that when executed are operable to receive location data including a plurality of location points from one or more mobile devices, vehicles, or mobile devices and vehicles traversing a path, the plurality of location points including a direction of travel of the one or more mobile devices, vehicles, or mobile devices and vehicles, project the plurality of location points on to an aggregation axis perpendicular to a geometric reference line of the path, group a subset of the plurality of location points having a same or similar direction of travel as projected onto the aggregation axis into one or more clusters, and determine a number of traffic lanes and a direction of the path based on a count of the one or more clusters and the direction of the subset of the plurality of location points.

BRIEF DESCRIPTION OF THE DRAWINGS

Exemplary embodiments of the present invention are described herein with reference to the following drawings.

FIG. 2A illustrates an example vehicle path with location data.

FIG. 2B illustrates an example projection of location data.

DETAILED DESCRIPTION

Figure 1:
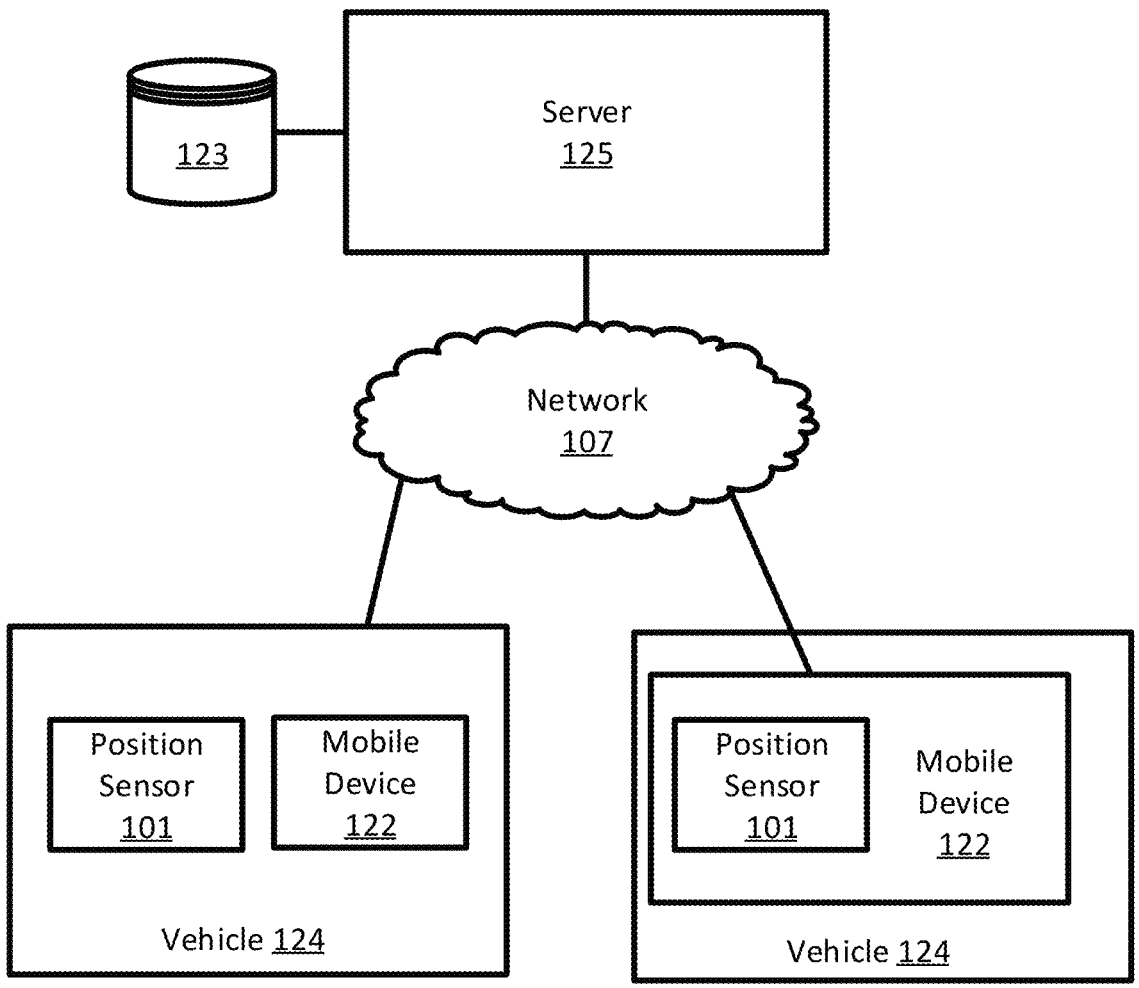
FIG. 1 illustrates an example system for collecting location data.

The number of lanes present on a road or vehicle path may be determined from location data. For example, location data from vehicles or uses traversing the road or vehicle path may be used to determine the number of lanes. The location data may be a measurement of a position. For example, a global positioning system (GPS) or global navigation satellite system (GNSS) may be used to measure a location of a user or vehicle traversing the road or path.

Vehicles traversing a road or path may remain in a lane, resulting in gaps between vehicles in different lanes. Accordingly, location data recorded by the vehicle or a user traversing the path may be confined to one lane of the road or path. Where location data from multiple vehicles is collected, the location data may be denser (e.g. more location data per linear or two-dimensional space) within a lane than between lanes. A difference in density may be more pronounced where vehicles maintain "lane discipline" and remain in a lane.

The location data may be collected from multiple vehicles or users traversing a path. The location data may include a coordinate or registration of the vehicle or user. For example, the location data may include a latitude, a longitude, a height, or other information. Additionally or alternatively, the location data may include a registration relative to the road or path. For example, the location data may include a length along a path, a lateral distance from a centerline of the path, and a height above the path. In some cases, the registration may be determined by matching the location data to a map.

The location data, including the coordinates or registration, may be grouped into one or more clusters. The number of clusters of the location data may be a count of the number of lanes on the road or path. In some cases, a density-based clustering method may be applied to the location data. For example, the density-based spatial clustering of applications with noise (DBSCAN) clustering method may be used.

While the clustering method may be expected to create clusters corresponding to the number of lanes, error in the measurement of the vehicle or user location reduces the difference in density between the lane and the space between lanes on the road or path. Though a vehicle may be traveling in a single lane for the length of the road or path, errors in measurement of the location of the vehicle may indicate the vehicle was traveling in between lanes or in multiple lanes. In particular, errors in the lateral position of the vehicle or user relative to the path may obscure any difference in location data density between lanes. In some cases, location measurements from GPS systems may have errors between 1 and 20 meters. Errors may be caused by weak signals received from positioning satellites (e.g. due to trees, tunnels, or tall buildings attenuating or reflecting positioning signals).

Applying a clustering method to the location data including the error may result in clusters that do not correspond to lanes on the road or path. For example, a clustering method may group a location point of the location data into one cluster based on a distance between the location point and neighboring location points of the location data. Due to location data errors and a lack of definition between lanes (e.g. similar location data density across the road or path), the clustering method may group the location data into clusters that are perpendicular to the road or path.

Pre-processing the location data before clustering may improve the correspondence between a number of clusters and a number of lanes on a road or path. For example, projecting the location data points onto a line that is perpendicular to a center line of the road or path and eliminating outlier location data may make it more likely that a clustering method applied to the processed location data results in a number of clusters that accurately counts a number of lanes on the road or path. For curved roads or paths, the path may be approximated by one or more linear segments, each location point of the location data may be matched to one of the segments, and the location data may be projected onto lines perpendicular to each linear segment. The number of clusters (and number of lanes) for each segment may be collected and the number of lanes for the whole curved path may be determined as the most common number of lanes for the segments.

FIG. 1 illustrates an example system for collecting location data. One or more vehicles 124 are connected to a server 125 though a network 127. The vehicles 124 may be directly connected to the server 125 or through an associated mobile device 122 or another intermediary. The mobile devices 122 and vehicles 124 may include a position sensor 101 configured to measure a position of the mobile device 122 or vehicle 124. The server 125 may be connected to a database 123. Additional, different, or fewer components may be included.

The mobile device 122 may be a standalone mobile device, such as a smartphone, or a device integrated with a vehicle 124. The mobile device 122 may include or be in communication with a positioning sensor 101. The mobile device may be configured to store location information generated by the positioning sensor 101. In some cases, the mobile device may send the location information to the server 125. The mobile device may include an application, such as a mapping or navigation application. In some cases, the application may receive the location information. The mobile device 122 may receive mapping or navigation information from the server 125. The application may use the received mapping or navigation information. For example, the application may use a navigation command sent by the server and received by the mobile device 122 to display navigation information on the mobile device 122.

The vehicle 124 may be any kind of machine that transports good or people. For example, the vehicle may be a motor vehicle (e.g. a car or a truck,) an aircraft (e.g. an airplane, helicopter, or a drone), a watercraft (e.g. a boat or hovercraft), or another kind of vehicle. The vehicle 124 may contain or be in communication with a positioning sensor 101. The vehicle 124 may be configured to send location information generated by the positioning sensor to the server 125 or to the mobile device 122. In some cases, the mobile device 122 may receive the location information from the vehicle 124 and send the location information to the server 125.

The vehicles 124 and mobile devices 122 may communicate with the server 125 through the network 107. The network may be one of a variety of types of wireless networks. Example wireless networks include cellular networks, the family of protocols known as Wi-Fi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long-term evolution (LTE) standards, 5G, DSRC (dedicated short-range communication), or another protocol.

The database 123 may be a geographic database. The geographic database may store information including maps and location data generated by the position sensors 101. The geographic database may be configured to send information such as map information to the server 125. Information stored in the database 123 may be updated by the server 125.

The server 125 may be configured to receive location data or location information generated by position sensors 101 from the mobile devices 122 and the vehicle 124 through the network 107. The server 125 may be configured to process the location information to update a map or to generate a mapping or navigation command. For example, the server 125 may be configured to determine a number of lanes of path based on the received location information and to update a map stored in the database 123 based on the number of lanes. In another example, the server is configured to determine a navigation command for the mobile device 122 or the vehicle 124 based on the received location information. The navigation command may be an autonomous driving command instructing the mobile device 122 or the vehicle 124 to take an action. The navigation command may include a route for the mobile device 122 or vehicle 124.

The position sensor 101 may generate location data including one or more measurements of the position sensor at a point in time. The location data may be generated by receiving GNSS or GPS signals and comparing the GNSS or GPS signals to a clock to determine the absolute or relative position of the vehicle 124 and/or mobile device 122. The location data may be generated by receiving radio signals or wireless signals (e.g., cellular signals, the family of protocols known as Wi-Fi or IEEE 802.11, the family of protocols known as Bluetooth, or another protocol) and comparing the signals to a pre-stored pattern of signals (e.g., a radio map). The mobile device 122 may act as the position sensor 101 for determining the position, or the mobile device 122 and the position sensor 101 may be separate devices. Additionally or alternatively, the vehicle 124 may act as the position sensor 101 for determining the position, or the vehicle 124 and the position sensor 101 may be separate devices.

The location data may describe a geographic location, for example with a longitude value and a latitude value. In addition, the location data may include a height or altitude. Additionally or alternatively, the location data may include a heading. The location data may be collected over time and include timestamps. In some examples, the location data is collected at a predetermined time interval (e.g., every second, every 100 milliseconds, or another interval). In some examples, the location data is collected in response to movement by the position sensor 101 (e.g., the sensor reports location information when the position sensor 101 moves a threshold distance). The predetermined time interval for generating the location data may be specified by an application or by the user. The interval for providing the location data from the mobile device 122 to the server 125 may be may the same or different than the interval for collecting the location data. The interval may be specified by an application or by the user.

The mobile device 122 may transmit the location data to the server 125 so that the server 125 may provide a service to the mobile device according to the location data. For example, the mobile device 122 or vehicle 124 may send location data to the server 125 and the server 125 may return a location-based service to the mobile device 122 or vehicle 124, such as a navigation command. In some cases, the navigation command may include a route, a position of the mobile device 122 or vehicle 124 on a map, or an autonomous driving command.

FIG. 2A illustrates an example path 201 with location data 203. The location data may be projected along a projection vector 205 to an aggregation axis 207 that is perpendicular to a centerline 209 of the path 201. The centerline 209 may be centered between the path boundaries 211.

The path 201 may be a road or other path traversed by a vehicle or user. For example, the path 201 may be a path suitable for a pedestrian, a drone, a boat, a bike, a vehicle, or a handicapped user. The path 201 may be divided into one or more lane to guide traffic along the path 201. Vehicle or user traffic may flow in one or both directions along the path 201. For example, the path 201 may be a two-lane road accommodating one lane of vehicle traffic in either direction along the path 201. In another example, the path may be a multi-lane highway accommodating multiple lanes of traffic in either direction. Though the path 201 shown includes three lanes, any number of lanes may be present on the path 201. The number of lanes on the path 201 may be not be known or no number of lanes may be associated with the path 201.

The location data 203 may be a measurement of a position of a user or a vehicle traversing the path 201. In some cases, a positioning sensor of the vehicle or of a user device may measure the position or location of the user or vehicle traversing the path 201. The location data 203 may include one or more location measurements from one or more users or vehicles traversing the path 201. For example, a vehicle may record multiple measurements of the location of the vehicle at different points during traversal of the path. A positioning sensor may measure the location. For example, the positioning sensor may use GPS or GNSS to measure a location of the vehicle or the user. The positioning sensor may be a part of a vehicle or of a user device. The user device may be a mobile device such as a cell phone.

The projection vector 205 may represent the path of a portion of the location data 203 as the data 203 is projected onto the aggregation axis 207. Each measurement of the location data 203 may be projected along a vector 205 onto the axis 207. The projection vector 205 may follow the course of the path 201. In some cases, the projection vector 205 may be parallel to a centerline 209 or boundary 211 of the path 201. In some other cases, the projection vector 205 may remain proportionally between the boundaries of the path 201. For example, the vector 205 may remain at a distance of one quarter of the width of the path 201 away from one of the boundaries as the path 201 narrows from one end to another. In still other cases, the vector 205 may be perpendicular to the aggregation axis 207.

The aggregation axis 207 may be defined as perpendicular to a centerline 209 of the path 201. The aggregation axis 207 may be a line on which the location data 203 is projected. By projecting the location data 203 onto the aggregation axis 207, information about the position of the location data 203 along the length of the path 201 may be removed and information about the position of the location data 203 along a width of the path 201 may be preserved. The information in the location data 203 along the length of the path 201 may be removed because every point of the location data 203 shares the position of the aggregation axis along the length of the path 201. The aggregation axis 207 may be defined at a start, end, or other position along the path 201 or a segment of the path 201. Multiple aggregation axes 207 may be defined for a path 201. For example, where the path 201 has a curve, the path may be broken into segments and an aggregation axis 207 defined for each segment of the path 201.

The centerline 209 may be defined as being in the middle of the path boundaries 211. For example, the centerline may divide in half a width of the path 201. Additionally or alternatively, the location of the centerline 209 may be predefined and the boundaries 211 defined relative to the centerline 209. For example, the boundaries 211 may be located at a predefined distance from the centerline 209. In some cases, the centerline 209 may be an estimate of the center of the path 201 or a geometric reference line for the path. For example, the centerline 209 may occupy an estimated position that differs in position from a geometric center of the path 201. In another example, the centerline 209 may be a geometric reference line corresponding to a course or position of the path 201. The geometric reference line may generally indicate the position of the path 201 but not precisely or perfectly indicate an exact boundary, position, center, or other geometric or geographic attribute of the path 201.

The path boundaries 211 may indicate an edge of the path 201. For example, the boundaries 211 may be located at the width of the path 201. Location data 203 outside of the boundaries 211 may be ignored or excluded from determining a number of lanes of the path 201. In some cases, the positions of the path boundaries 211 may not be known. For example, only the centerline 209 of the path 201 is known but not the path boundaries 211.

FIG. 2B illustrates an example projection of location data 203. When projected onto the aggregation axis 207 perpendicular to the center line 209, the location data 203 may become projected location data 213.

The projected location data 213 may lie along the aggregation axis 207. Outlier location data points of the location data 203 may be removed from the location data 203 prior to the location data 203 being projected on the aggregation axis 207 to form projected location data 213. Removing outlier data points may improve the efficiency and accuracy of clustering the projected location data 213.

Figure 3:
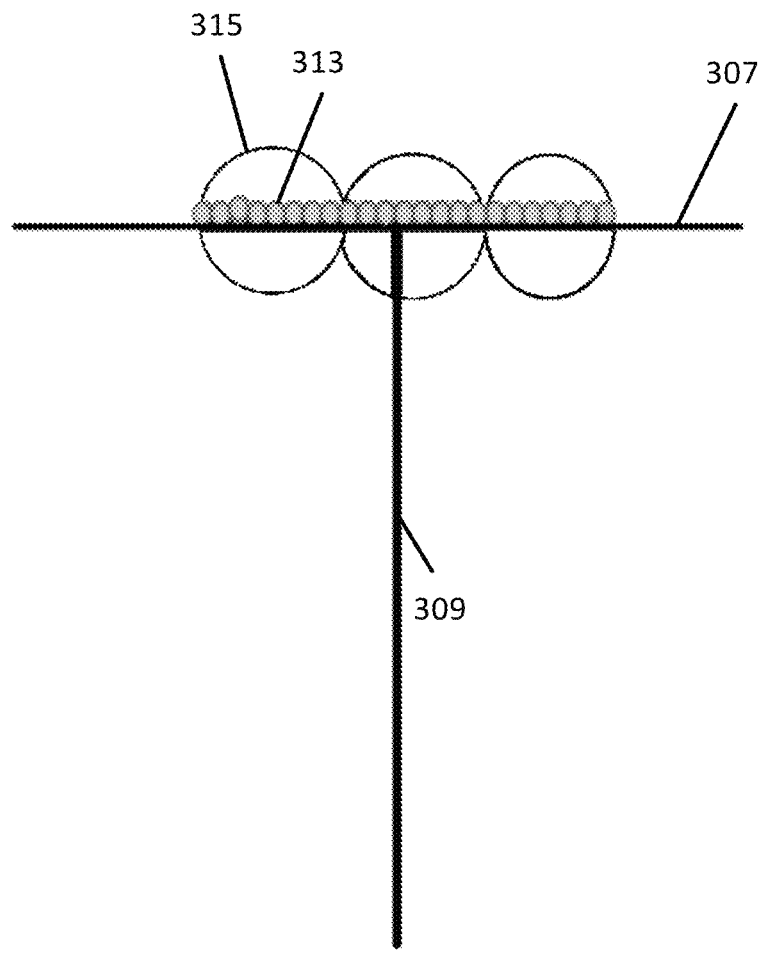
FIG. 3 illustrates an example clustering of projected location data.

FIG. 3 illustrates an example clustering of projected location data 313. The projected location data 313 may lie on an aggregation axis 307 that is perpendicular to a centerline 309 of a path. The projected location data 313, aggregation axis 307 and centerline 309 may be the projected location data 213, aggregation axis 207, and centerline 209 of FIG. 2. The projected location data 313 may be grouped into one or more clusters 315.

The clusters 315 may be formed by applying a clustering method to the projected location data 313. For example, a density-based clustering method such as DBSCAN may be used. DBSCAN groups points of the location data into clusters by defining core points, reachable points, and outliers. Alternatively, a hierarchical density clustering method such as HDBSCAN may be used. For DBSCAN, a first location data point of the projected location data 313 may be a core point if a minimum number of other location points are within a predetermined distance (e.g. a "neighborhood") of the core point. Every location data point in the neighborhood of the first point are directly reachable from the first point. A second location data point may be a reachable point if a path may be constructed from the second point to the first point using only other points that are directly reachable from the first point (e.g. all the location data points on the path are core points). A point may be an outlier point if it is not reachable from any other points. A core point may form a cluster 315 with the other points that are reachable from (e.g. in the neighborhood of) the core point. By changing the value of cluster criteria such as the distance of the neighborhood and the minimum number of other location points required to define a core point, different arrangements, and numbers of clusters 315 may be formed from the same projected location data 313. The different arrangements or sets of clusters created according to different cluster criteria may be evaluated by determining a degree of overlap between the clusters 315. Clusters with minimal overlap may more accurately reflect or correspond to the number of lanes on the path.

Figure 4A:
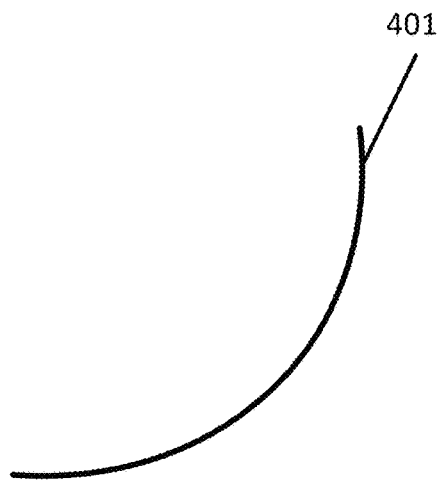
FIG. 4A illustrates an example curved path.
Figure 4B:
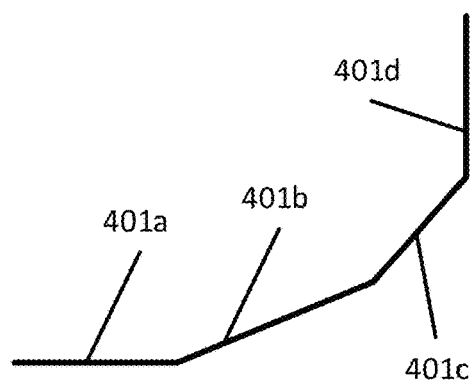
FIG. 4B illustrates an example set of linear segments approximating a curved path.
Figure 4C:
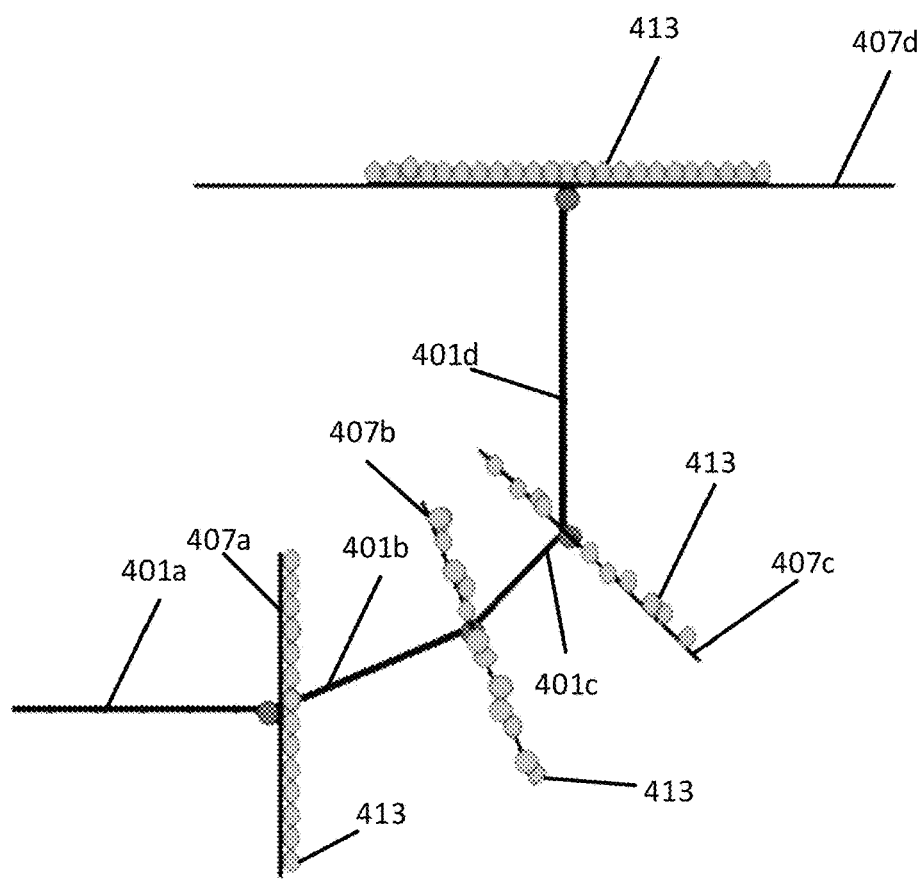
FIG. 4C illustrates an example projection of location data for one or more linear segments.

FIGS. 4A-4C illustrate fitting a curved path 401 with linear segments 401a-d. Aggregation axes 407a-d may be defined for each segment 401a-d upon which location data 413 may be projected. The path 401 may be the path 201 from FIG. 2 or path 301 from FIG. 3. The aggregation axes 407a-d may be the aggregation axis 207 from FIG. 2 or 307 from FIG. 3. The location data 413 may be the location data 203 or projected location data 213 from FIG. 2 or the projected location data 313 from FIG. 2.

The path 401 may have a bend or curved geometry. Because of the curve, it may be computationally expensive to project the location data 413 onto an aggregation axis 407 of the path 401. Instead, the path 401 (and the location data 413) may have segments 401a-d fitted to it.

In some cases, the path 401 may be a straight line and have segments 401a-d fitted to it. For example, the path 401 may represent a straight section of highway with an on ramp that merges into a lane. Because the path 401 may have different widths and lanes along the length of the path 401, it may be advantageous to break the straight path 401 into linear segments 401a-d and to determine the number of lanes present over each section. For example, breaking a path into segments 401a-d may allow for each segment to be analyzed in parallel.

The segments 401a-d may be fitted to the path 401. The segments 401a-d may be linear segments approximating a curvature of the path 401. The segments 401a-d may be continuous over the length of the path 401. The segments 401a-d may have a uniform length or different lengths. A centerline of each respective segment 401a-d. may represent the segments 401a-d.

The segments 401a-d may be fitted to the curvature of the path 401 using any technique. For example, one or more points on the segment 401a-d may be aligned on the path. A first end of the segment 401a may correspond or have the same location as a first end of the path 401. Additionally or alternatively, a midpoint or other point on the segment 401a-d may lie on the path 401 and the segment 401a-d may be oriented to be tangent to the path 401 at the point lying on the path 401. Combinations of the above techniques may be used to fit the segments 401a-d to the path 401. The segments 401a-d may serve as a centerline for the path 401.

The aggregation axes 407a-d may be defined for each segment 401a-d of the path 401. The aggregation axes 407a-d may be determined to be perpendicular to the path segments 401a. For example, the aggregation axis 407a may be perpendicular to the path segment 401

The location data 413 may be divided and associated with one of the segments 401a-d. For example, location data points of the location data 413 lying on either side of the segment 401a will be associated with segment 401a, but not any of the other segments. The location data 413 associated with each segment 401a-d may be grouped into clusters for each segment. The number of clusters for each segment 401a-d may represent a number of lanes for that segment 401a-d. The most popular number of lanes for the segments 401a-d may be chosen as a number of lanes for the entire path 401. For example, segment 401a may be determined to have two lanes while segments 401b-d may be determined to have three lanes. In this case, the path 401 may be determined to have three lanes because the majority of segments 401a-d were determined to have three lanes. In another example, an average is taken of the number of lanes determined for the segments 401a-d.

Figure 5:
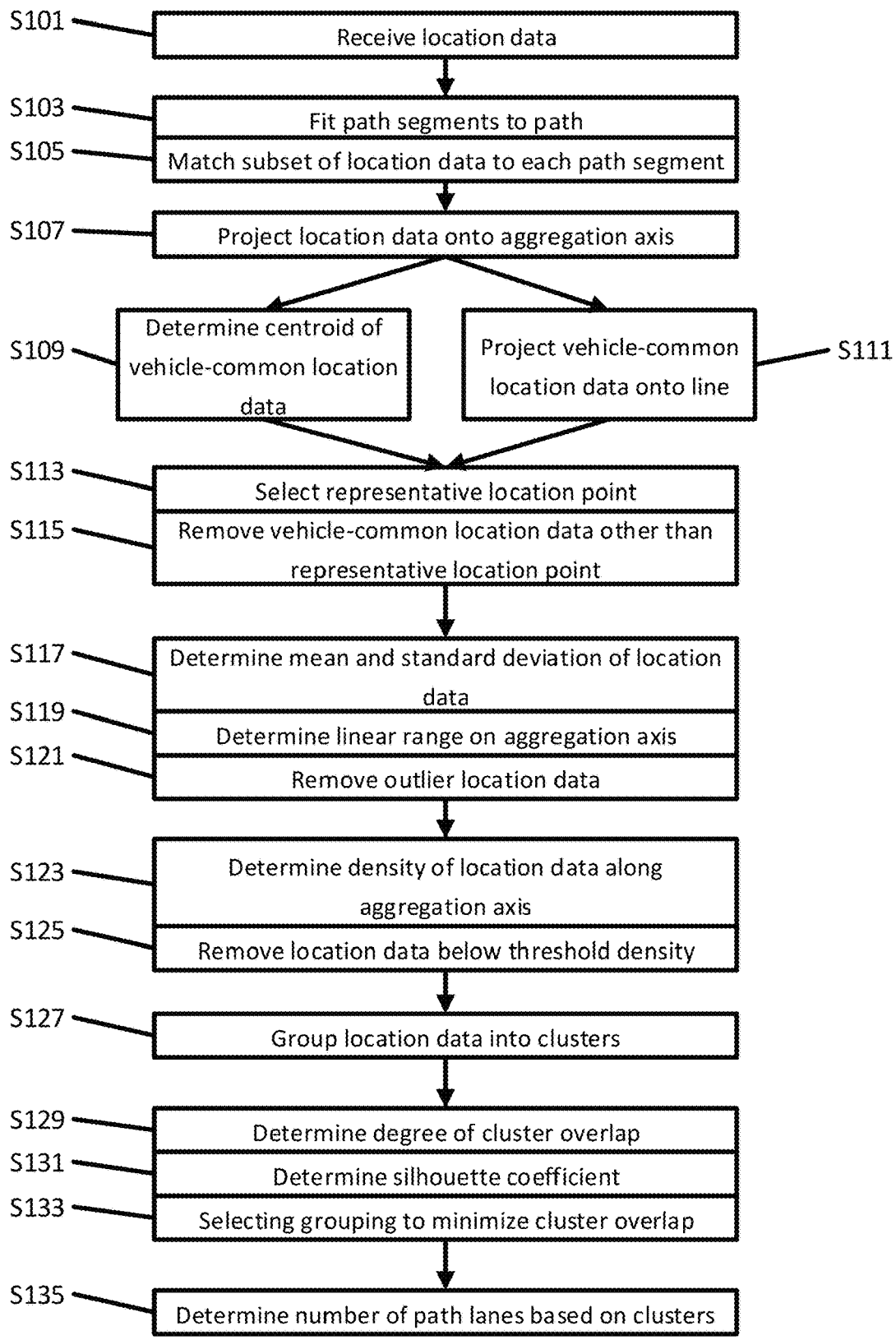
FIG. 5 illustrates an example flowchart for estimating a number of lanes.

FIG. 5 illustrates an example flowchart for estimating a number of lanes. Additional, different, or fewer acts may be provided. For example, acts S103 and S105 may not be performed. The acts may be performed in any order. For example, acts S117-S121 may be performed after acts S123 and S125. In some cases, acts S109 and S111 may be alternatives. In some other cases, both act S109 and act S111 are performed. The acts of FIG. 5 may be performed by the server 125 in communication with the geographic database 123.

In act S101, location data is received. The communication interface 805 of the server 125 or the receiver 903 of the lane count estimator 901 may receive the location data. The location data may indicate the position of one or more vehicles or users traversing a path. For example, the location data may be collected by a position sensor of a vehicle 124 or a mobile device 122 of the user. The location data may include a plurality of location points. The location points may be individual measurements of the location of a vehicle or a user. A positioning sensor may measure the location. The positioning sensor may be in communication with or a part of a vehicle or a mobile device of a user. In some cases, the location data includes only vehicles, users, or mobile devices moving in a similar direction. For example, the location data may only include positions of vehicles or users traversing the path in the same or similar direction (e.g. east to west, north to south, left to right). Multiple sets of location data may be received for each direction of travel on the path. In some other cases, the location data includes position information from vehicles, mobile devices, and users traveling in more than one direction. Subsets of the location data may be formed that each contain vehicles, mobile devices, or users traveling in the same or a similar direction of travel along the path.

In act S103, one or more path segments are fitted to the path. The server 125 may be configured to receive the path from the database 123 and fit the path segments to the path. Additionally or alternatively, the vehicle path processor 909 may be configured to fit the path segments to the path. The segments may be linear segments. Together, the path segments may form a linear approximation of the path. The segments may be continuous. In some cases, a geometry (e.g. a curvature) of the path (or of a centerline of the path) may be defined based on one or more shape points. The one or more path segments may be fit to the path by connecting the shape points. In this way, the path segments may follow the geometry of the path or of a centerline of the path. Each path segment may have an aggregation axis.

In act S105, location data is matched to the path segments. The server 125 may be configured to match the location data received by the communication interface 805 to the path segments via instructions stored in the memory 803 and executed by the processor 801. Additionally or alternatively, the vehicle path processor 909 may be configured to match the data to the segments. When the path is divided into segments or approximated by path segments, the location data for the path may also be divided. Location points of the location data may be matched to a path segment. For example, a distance between the location point and the one or path segments may be determined. The location point may be matched to the nearest path segment. By matching the location points to the segments, a subset of the location data may be associated with each path segment. The subset of location data may include only those vehicles, users, or mobile devices traversing the path in the same or a similar direction of travel.

In act S107, the location data may be projected onto an aggregation axis. The server 125 may be configured to project the location data received by the communication interface 805 onto an aggregation axis via instructions stored in the memory 803 and executed by the processor 801. Additionally or alternatively, the aggregator 911 may be configured to project the data. The aggregation axis may be defined as perpendicular to a centerline of the path or path segment. The aggregation axis may extend indefinitely or have a defined length. For example, the aggregation axis may extend to the width of the path. In some cases, location points outside the width or boundary of the path may be excluded or removed from the location data. The location data may be projected along a projection vector that is perpendicular to the aggregation axis. In some cases, projecting the location data may involve moving a location data point to the aggregation axis. In some other cases, projecting the location data modifying the information associated with location points of the location data such that the location point is not registered long a length of the path and retains only information about a position of the location point along a width of the path. In still other cases, location data corresponding to only one direction of travel may be projected onto the aggregation axis. For example, a subset of location data including vehicles, users, or mobile devices traversing the path in the same or a similar direction of travel may be projected onto the aggregation axis.

In act S109, a centroid of location data may be determined. The server 125 may be configured to determine the centroid of the data received by the communication interface 805 via instructions stored in the memory 803 and executed by the processor 801. Additionally or alternatively, the statistics processor 907 may be configured to determine the centroid. In some cases, the location data may contain multiple measurements of a vehicle or user traversing the path. These may be considered to be from the same "trace" of the vehicle or user. In some cases, the location points measuring the position of the same user or vehicle multiple times may be termed "vehicle-common" or "user-common." The centroid of the vehicle-common or user-common location data may be found. The centroid may be a point at a geometric center of the vehicle-common or user-common location points.

In act S111, the vehicle-common or user-common location points may be projected onto a line that is perpendicular to a centerline of a path or path segment. The server 125 may be configured to project the vehicle-common or user-common location data via instructions stored in the memory 803 and executed by the processor 801. Additionally or alternatively, the aggregator 911 may be configured to project the vehicle-common or user-common location data onto a line. In some cases, the vehicle-common or user-common location points may be projected onto the line in a manner similar to act S107. A mean or average position of the vehicle-common or user-common location data as projected onto the line may be determined.

In act S113, a representative point of the vehicle-common or user-common location data is chosen. The server 125 may be configured to choose the representative point via instructions stored in the memory 803 and executed by the processor 801. Additionally or alternatively, the location data processor 905 may be configured to determine the representative point. In some cases, the representative point is chosen based on the centroid determined in act S109. For example, the representative point may be a location point of the vehicle-common or user-common location data that is closest to the centroid. In some other cases, the representative point is chosen based on the mean or average position determined in act S111. For example, the representative point may be a location point of the vehicle-common or user-common location data (as projected on the line) that is closest to the mean or average position.

In act S115, the location points of the vehicle-common or user-common location data other than the representative point may be removed. The server 125 may be configured to remove the non-representative vehicle-common or user-common location points via instructions stored in the memory 803 and executed by the processor 801. Additionally or alternatively, the location data processor 905 may be configured to remove the location points of the vehicle-common or user-common location data other than the representative point. By choosing a representative point and discarding the rest of the location data generated by a particular vehicle or user, the accuracy and efficiency of the clustering may be improved. For example, having fewer location points to group into clusters may reduce the time needed to create the cluster. In another example, keeping only the representative point may prevent potentially erroneous location points from being clustered, thereby improving a correspondence between a number of clusters determined for the path and the number of lanes on the path. Also, a slow-moving vehicle, user, or mobile device will contribute more to the density as compared to a faster moving vehicle, user, or mobile device on the same path. Choosing a representative point may ensure that only one point per vehicle, user, or mobile device contributes to the density of the total points.

In act S117, a standard deviation may be determined for the location data as projected onto the aggregation axis. The server 125 may be configured to determine the standard deviation via instructions stored in the memory 803 and executed by the processor 801. Additionally or alternatively, the statistics processor 907 may be configured to determine the standard deviation. The standard deviation may be determined for the lateral positions of the location points on the aggregation axis. The standard deviation may be found my finding a mean position of the location data on the aggregation axis, finding a difference between each location point and the mean, squaring the differences, adding the differences together, dividing by one less than a number (e.g. a count) of the location points, and taking the square root of the result. Where the standard deviation is smaller than the typical width of a single lane road, it may be determined that the path has only a single lane. In this case, it may not be necessary to cluster the location data to determine the number of lanes.

In act S119, a linear range is determined along the aggregation axis. The server 125 may be configured to determine the linear range via instructions stored in the memory 803 and executed by the processor 801. Additionally or alternatively, the statistics processor 907 may be configured to determine the linear range. A width of the linear range may be based on the mean and the standard deviation determined for the location data as projected on the aggregation axis. In some cases, the linear range may extend to a distance of a multiple of a standard deviation beyond the mean. For example, the linear range may extend 1.5 standard deviations beyond the mean.

In act S121, an outlier subset of the location data may be removed. The server 125 may be configured to remove outlier location data via instructions stored in the memory 803 and executed by the processor 801. Additionally or alternatively, the location data processor 905 may be configured to remove outliers. The outlier subset may be those location points of the location data outside of the linear range. The remaining location points after removal of the outlier subset may be a remainder. Removing the outlier points may help improve the efficiency and accuracy of clustering.

In act S123, a density of the location data along the aggregation axis may be determined. The server 125 may be configured to determine the density via instructions stored in the memory 803 and executed by the processor 801. Additionally or alternatively, the statistics processor 907 may be configured to determine the density. The density may be a measure of the number of location points per unit length along the aggregation line. Determining the linear density along the aggregation axis may help identify regions of lower density. Such low-density regions may correspond to gaps between lanes.

In act S125, location data is removed based on the density. The server 125 may be configured to remove location points based on the density via instructions stored in the memory 803 and executed by the processor 801. Additionally or alternatively, the location data processor 905 may be configured to remove location data based on the density. For example, a threshold minimum density may be specified. Location points residing in sections of the aggregation axis having a density below the threshold may be removed. Because low-density may indicate a gap between vehicles or users traveling in a lane, the location data may be removed from lower-density areas because the location points in such areas may be erroneous. For example, the location data points between lanes may be due to an error in the positioning system or due to a vehicle or user changing lanes. In another example, a method like Local Outlier Factor (LOF) can be used.

In act S127, the location data may be grouped into clusters. The server 125 may be configured to group the location data into clusters via instructions stored in the memory 803 and executed by the processor 801. Additionally or alternatively, the aggregator 911 may be configured to group the location data into clusters. The location data may be the remaining data after location data points were removed in one or more of acts S115, S121, and S125. The location data as projected onto the aggregation axis may be grouped into clusters. Where there are multiple aggregation axes, for example where the path has been broken into path segments, the location data on each aggregation axis may be grouped into clusters. The location data may be clustered by applying a clustering method to the location data. For example, DBSCAN or HDBSCAN may be used.

Multiple sets of clusters may be generated according to different cluster criteria. For example, with DBSCAN, different clustering scenarios are possible by changing the cluster criteria for a core point: the size (distance) of a neighborhood and the minimum number of points in the neighborhood. Creating different sets of clusters based on different cluster criteria may allow for more accurate determination of the number of lanes on the path. In some cases, the multiple clusters may be displayed on a display 71 or input device such as a personal computer or terminal 807. In some other cases, the cluster criteria may be selected based on input from an input device 703, 807.

In act S129, a degree of overlap of the clusters may be determined. The server 125 may be configured to determine a measure of overlap between the clusters via instructions stored in the memory 803 and executed by the processor 801. Additionally or alternatively, the statistics processor 907 may be configured to determine a measure of overlap between the clusters. Cluster overlap may be measured by determining a silhouette coefficient. The overlap may be determined for each set of clusters from act S127 according to different cluster criteria.

In act S131, a silhouette coefficient is determined. The server 125 may be configured to determine the silhouette coefficient via instructions stored in the memory 803 and executed by the processor 801. Additionally or alternatively, the statistics processor 907 may be configured to determine the silhouette coefficient. The silhouette coefficient may take into account a measure of the distance between a location point and every other location point in the same cluster and also a measure of the distance between the location point and other location points in other clusters. The clusters have little overlap and are very distinct when the silhouette coefficient approaches 1, and more overlap when the silhouette coefficient approaches −1. The silhouette coefficient may be determined for each set of clusters grouped according to different cluster criteria.

In act S133, a grouping or set of clusters is chosen based on minimizing overlap between clusters. For example, a set of clusters having a highest overall silhouette coefficient for the location points may be chosen. The server 125 may be configured to choose the grouping or set of clusters via instructions stored in the memory 803 and executed by the processor 801. Additionally or alternatively, the geographic data processor 913 may be configured to choose the grouping or set of clusters. In some cases, the grouping or set of clusters may be chosen based on input from an input device 703, 807.

In act S135, a number of lanes is determined for the path based on the number of clusters. For example, where three clusters are formed from the location data, the path may be determined to have three lanes. The server 125 may be configured to determine the number of lanes via instructions stored in the memory 803 and executed by the processor 801. The server 125 may update the database 123 with the number of lanes for the path. Additionally or alternatively, the geographic data processor 913 may be configured to determine the number of lanes. Where the path has been split into segments, the number of lanes for the whole path including all the segments may be based on a number of clusters formed by a majority of the segments. For example, where a majority of the segments have location data grouped into five lanes, the whole path may be determined to have five lanes. Where there is no majority, the number of lanes may be chosen based on an average number of lanes or based on another method.

Figure 6:
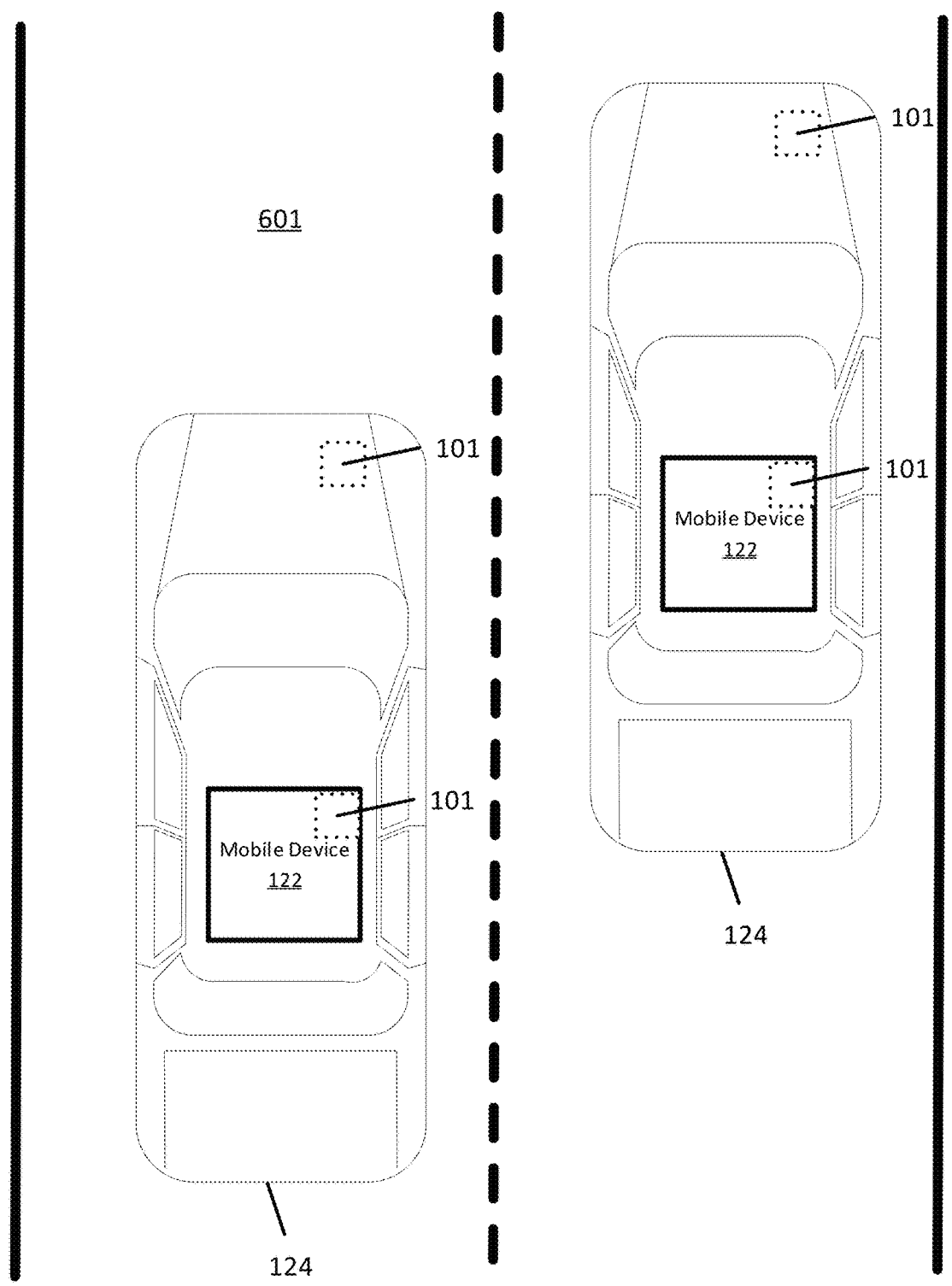
FIG. 6 illustrates another example system for collecting location data.

FIG. 6 illustrates another example system for collecting location data. The system may include one or more positioning sensors 101 in communication with a mobile device 122 and vehicle 124 traversing a path 601.

The positioning sensor 101 may be in communication with or a part of the mobile device 122 or the vehicle 124. The positioning sensor 101 may measure a location of the vehicle 124 or the mobile device 122 as the vehicle 124 or the mobile device 122 traverse the path 601. The positioning sensor 101 may generate location information including multiple measurements of the location of the vehicle 124 or the mobile device 122. The measurements may be location points indicating the measured positions of the vehicle 124 or the mobile device 122. The positioning sensor 101 may send the location information including one or more location points to the mobile device 122 or the vehicle 124.

The mobile device 122 may receive a stream of location information from the positioning sensor 101. For example, the positioning sensor 101 may periodically measure the location of the mobile device 122 as it traverses the path 601. The mobile device 122 may send the location information to the server 125 of FIG. 1. The mobile device 122. may belong to or be associated with a user.

The vehicle 124 may receive a stream of location information from the positioning sensor 101. For example, the positioning sensor 101 may periodically measure the location of the vehicle 124 as it traverses the path 601. The vehicle 124 may send the location information to the server 125 of FIG. 1.

The path 601 is a path traversed by the mobile device 122 or the vehicle 124. The database 123 of FIG. 1 may store information about the path. For example, the path may have a number of lanes of traffic and the number of lanes may be stored in the database 123. The server 125 may be configured to determine the number of lanes of traffic on the path 601 based on location information generated by position sensors 101 on the path 601. For example, location information from both vehicles 124 shown may be used by the server 125 to determine that there are two lanes of traffic on the path. The path may have more or fewer lanes of traffic.

Figure 7:
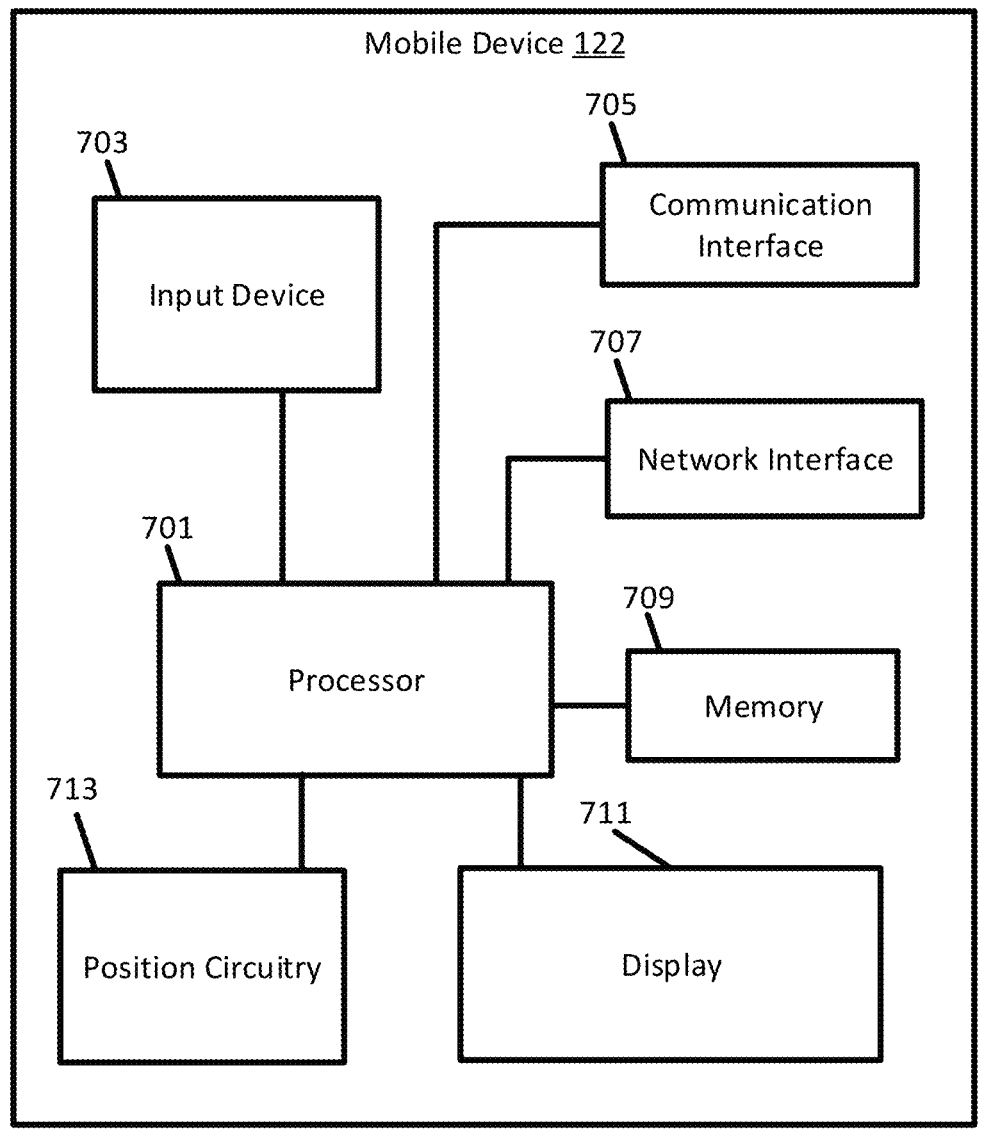
FIG. 7 illustrates a further example system for collecting location data.

FIG. 7 illustrates a further example system for collecting location data. The system may include a mobile device 122, for example, as described in FIGS. 1 and 6. The Mobile device 122 may include a processor 701, an input device 703, a communication interface 705, a network interface 707, a memory 709, a display 711, and a position circuitry 713. Different or fewer components may be present. For example, the mobile device 122 may not include position circuitry 713. In another example, the network interface is part of the communication interface 705.

The processor 701 may be a general processor or application specific integrated circuit. The processor 701 may retrieve or receive instructions stored in the memory 709 and execute the instructions.

The input device 703 may be used for interacting with the mobile device 122 or to change settings of the mobile device 122. For example, the input device 703 may be used to interact with an application of the mobile device 122, such as a mapping or navigation application. In another example, the input device 703 may be used to specify a setting of the position circuitry 713. The input device 703 may be used to specify the interval at which the position circuitry measures a location of the mobile device 122.

The communication interface 705 may provide for the exchange of information between the mobile device 122 and outside systems. For example, the communication interface 705 may form a connection to one or more position sensors or other sensors that are external to the mobile device 122. In another example, the communication interface may form a connection between the mobile device and a vehicle. In this way, the mobile device may send and receive data to the sensors and vehicles external to the mobile device. For example, the mobile device may receive location information from a position sensor that is part of the vehicle.

The network interface 707 may form a connection to the network 107. For example, the network interface 707 may be coupled with antennas for transmitting and receiving data. In some cases, the network interface 707 forms a connection to the network 107. In this way, the network interface 707 may allow for the exchange of data between the mobile device 122 and the server 125 or the database 123. In some cases, the network interface 707 may be a part of the communication interface 705.

The memory 709 may be a volatile memory or a non-volatile memory. The memory 709 may include one or more of a read only memory (ROM), random access memory (RAM), a flash memory, an electronic erasable program read only memory (EEPROM), or other type of memory. The memory 709 may be removable from the mobile device 122, such as a secure digital (SD) memory card. The memory 709 may store instructions to cause the processor 701 to perform one or more acts. The memory may be configured to store location information from the position circuitry 713 or a positioning sensor.

The display 711 may be a liquid crystal display (LCD) panel, light emitting diode (LED) screen, thin film transistor screen, or another type of display. An output interface of the display 711 may also include audio capabilities, or speakers. The display 711 may indicate a status or other information about the mobile device 122, the positioning circuitry 713, or a positioning sensor in communication with the mobile device 122. The display 711 may display mapping or navigation information. For example, a navigation or mapping application on the mobile device 122 may use the display to present mapping or navigation information.

The position circuitry 713 may be a positioning sensor. For example, the position circuitry may use GPS or GNSS to measure its location. In some cases, the position circuitry 713 may be remote from the mobile device 122. The position circuitry 713 may communicate with the processor 701 directly or through one or more intermediaries. For example, the position circuitry may communicate with the processor 701 of the mobile device 122 through the communication interface 705. The position circuitry 713 may measure a location of the mobile device 122. In some cases, the position circuitry 713 measures the location of the mobile device 122 periodically or at a predetermined interval. The position circuitry 713 may be configured to send the measured location to the mobile device 122, for example to the processor 701. The location information generated by the position circuitry 713 may be sent to the server 125.

Figure 8:
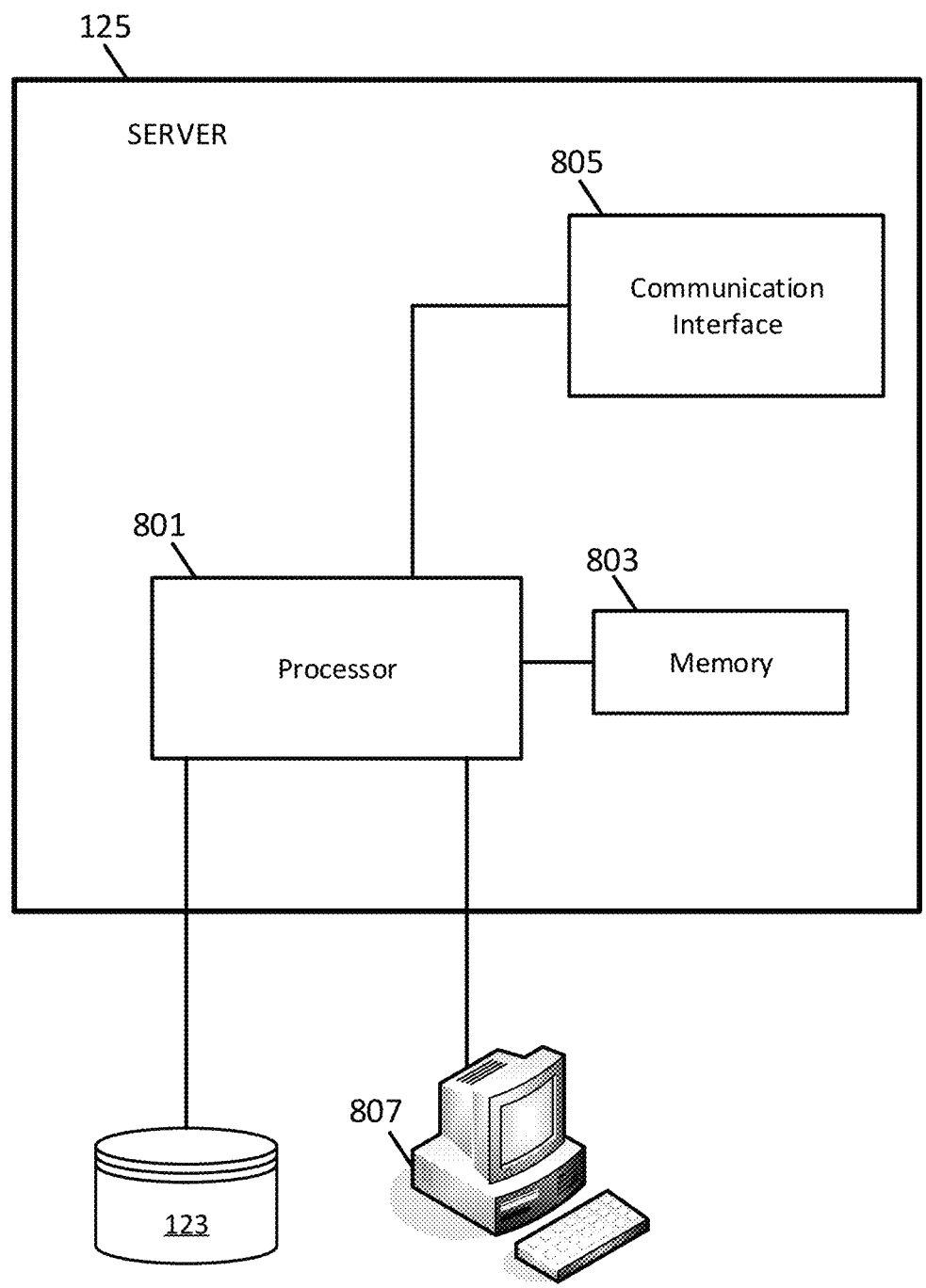
FIG. 8 illustrates an example server.

FIG. 8 illustrates an example server 125. The server 125 may be the server 125 of FIG. 1. The server 125 may include a processor 801, a memory 803, a communication interface 805, and an input device 807. The server 125 may be in communication with a database 123.

The processor 801 may be a general processor or application specific integrated circuit. The processor 801 may retrieve or receive instructions stored in the memory 803 and execute the instructions.

The memory 803 may be a volatile memory or a non-volatile memory. The memory 803 may include one or more of a read only memory (ROM), random access memory (RAM), a flash memory, an electronic erasable program read only memory (EEPROM), or other type of memory. The memory 803 may be removable from the server 125, such as a secure digital (SD) memory card. The memory 803 may store instructions to cause the processor 801 to perform one or more acts. The memory may be configured to store location information from the position circuitry 713 or a positioning sensor.

The communication interface 805 may provide a connection between the server 125 and the network 107. In some cases, the communication interface 805 may facilitate the receipt of the location information from the mobile device 122 or the vehicle 124.

The input device 807 may be a keyboard, terminal, or personal computer. The input device may be used to enter or modify settings of the server 125. For example, the setting may include one or more cluster criteria. In another example, the settings including selection of a particular path for which a number of lanes is to be determined. In some cases, the input device may be used to select one or more location information preprocessing steps, such as density-based location data removal, standard deviation-based location data removal, or vehicle-common or user-common location data removal.

The database 123 may be directly connected to the server 125 or accessible though a network 107. For example, the server 125 may communicate with the database 123 through the communication interface 805. In some cases, the database may be stored in the memory 803. The database 123 may be configured to store location information.

Figure 9:
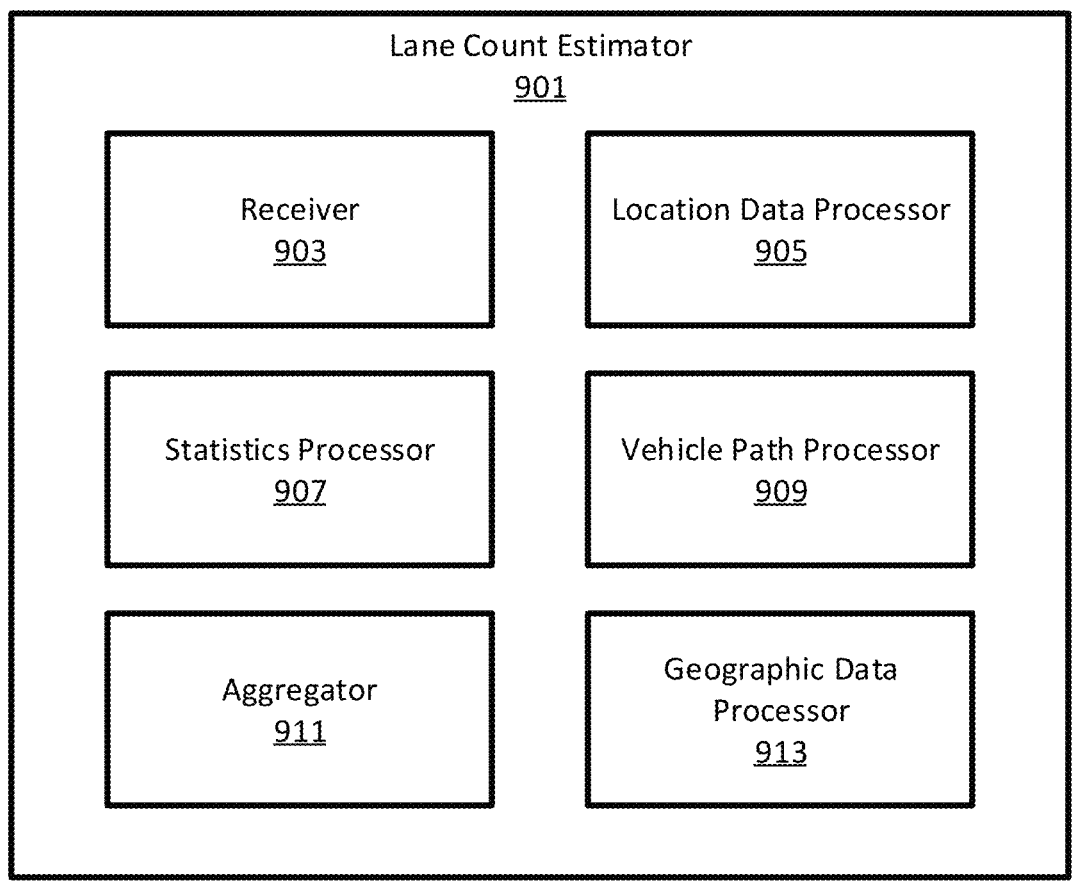
FIG. 9 illustrates an example system for assigning a number of lanes on a path.

FIG. 9 illustrates an example system for assigning a number of lanes on a path. The system may include a lane count estimator 901. The lane count estimator may include a receiver 903, a location data processor 905, a statistics processor 907, a vehicle path processor 909, an aggregator 911, and a geographic data processor. More, different, or fewer components may be provided. The lane count estimator 901 may be implemented by the server 125 of FIGS. 1 and 8 or by another computing device remote to the mobile device 122 and vehicle 124.

The receiver 903 be configured for digital or analog communication with one or more position sensors. For example, the receiver 903 may be configured to receive location information from one or more position sensors through the network 107. The receiver may be implemented by or a part of the communication interface 805 of the server 125. The receiver 903 may include one or more amplifiers, digital to analog converters, or analog to digital converters.

The location data received by the receiver may include a plurality of location points recorded by one or more vehicles or mobile devices.

The location data processor 905 may be implemented by the processor 801 based on instructions stored in the memory 803 of the server 125. The location data processor 905 may be configured to remove a portion of the location data. For example, the location data processor may be configured to remove a number of location data points in the location data that were generated by the same vehicle, user, or mobile device. The location data points generated by the same vehicle, user, or mobile device may be referred to as vehicle-common or user-common because each of the location points is associated with a common vehicle, user, or mobile device. The location data processor 905 may be configured to determine a representative point of the vehicle-common or user-common location points and to remove the rest of the vehicle-common or user-common location points (e.g. those location points not selected as the representative point) from the location data. The location data processor 905 may be configured to select the representative point based on a centroid of the vehicle-common or user-common location points. For example, the representative point may be the vehicle-common or user-common location point closest to the centroid. Additionally or alternatively, where the vehicle-common or user-common location points are projected on a line perpendicular to a centerline of the path, the representative point may be the vehicle-common or user-common location point closest to a mean of the vehicle-common or user-common location points. Where the location data includes multiple sets of vehicle-common or user-common location points (e.g. a plurality of vehicles each having generated more than one location point along the path), the selection of the representative point and removal of the non-selected points may be repeated for each set of vehicle-common or user-common location points.

The location data processor 905 may be configured to perform standard deviation-based outlier removal on the location data. The outliers may be the portion of the location data removed by the location data processor 905. A linear range may be defined (e.g. by the statistic processor 907) for the location data projected onto the aggregation axis. The linear range may be based on a standard deviation and/or the mean of the location data. The location data processor 905 may be configured to remove the location points that lie outside of the linear range from the location data. The location points that lie outside of the linear range may be referred to as an outlier subset of location data.

The location data processor 905 may be configured to perform density-based outlier removal on the location data. The outliers may be the portion of the location data removed by the location data processor 905. A minimum threshold density may be defined below which location data is to be excluded. Removing location points lying in less dense areas may more clearly define the lanes present on the path after grouping the location data into clusters. The location data processor 905 may be configured to remove those location points residing in a linear space having below the minimum threshold density. The density may be defined as a minimum number of location points per unit distance. For example, the minimum threshold density may be 1 location point per meter. Where a location data point is more than 0.5 meters from its nearest neighboring location data points (e.g. the location point is the only location point located on a section of the aggregation axis longer than 1 meter, or the distance from the nearest neighbor to the right of the location data point to the nearest neighbor to the left of the location data point is greater than 1 meter), the location data processor 905 may be configured to remove the location point.

The location data processor 905 may be configured to select a grouping or arrangement of clusters of the location data based on a degree of overlap determined for the clusters. For example, where multiple arrangements or sets of clusters of the location data have been generated based on multiple cluster criteria, the location data processor 905 may select an arrangement or set of clusters with the least or minimal overlap between clusters. Minimizing cluster overlap may improve correspondence between a number of clusters and a number of lanes for the path.

The statistics processor 907 may be implemented by the processor 801 based on instructions stored in the memory 803 of the server 125. The statistics processor 907 may be configured to determine one or more mathematical quantities of the location data. For example, the statistics processor 907 may be configured to determine a mathematical quantity such as a standard deviation of the location information. In some cases, the statistics processor 907 may determine a standard deviation of the location data as projected on the aggregation axis. In some cases, the statistics processor 907 may be configured to determine a mean or average lateral position of the location data as projected on the aggregation axis. Based on the standard deviation and/or the mean, the statistics processor 907 may configured to determine a linear range on the aggregation axis. For example, the linear range may extend at a width of one standard deviation on either side of the mean. In another example, the linear range extends 1.5 standard deviations on either side of the mean. Other multiples of the standard deviation may be used to define the linear range. The width of the linear range may correspond to a width of the path. For example, the linear range may be chosen to be smaller than the width of the path. Location data points located outside of the linear range may be removed or discarded from the location data prior to grouping into clusters.

The statistics processor 907 may be configured to determine a mathematical quantity such as a mean of vehicle-common or user-common location points as projected onto a line perpendicular to the centerline of the path. The mean may be used by the location data processor to pick a representative point.

The statistics processor 907 may be configured to determine a mathematical quantity such as a centroid of vehicle-common or user-common location points. The centroid may be defined as a point that minimizes the sum of squared distances between the centroid and the vehicle-common or user-common location points (for a particular vehicle, user, or mobile device). The centroid may be determined for each set of vehicle-common or user-common location points where the location data includes multiple location points from multiple, vehicles, users, or mobile devices.

The statistics processor 907 may be configured to determine a mathematical quantity such as a density of the location points as projected on the aggregation axis. The density may be defined as a number of location points per linear unit of distance along the aggregation axis. The density may be defined for subsections of the aggregation axis. In some cases, the density may be determined for each span of 0.1 meters along the aggregation axis. For example, where a span of the aggregation axis is 0.1 meters wide and includes 2 location points, the density on the subsection of the aggregation axis may be determined to be 20 points per meter. Spans of the aggregation axis having below a threshold density may be removed from the location data.

The statistics processor 907 may be configured to determine a mathematical quantity such as a degree of overlap between clusters of location data. The degree of overlap may be measured or indicated by a silhouette coefficient or another measure. The degree of cluster overlap may be determined for each set or arrangement of clusters when multiple sets or arrangements of clusters have been generated according to multiple cluster criteria.

The vehicle path processor 909 may be implemented by the processor 801 based on instructions stored in the memory 803 of the server 125. The vehicle path processor 909 may be configured to linearize a curve of a path. For example, the vehicle path processor 909 may fit one or more linear path segments to the path. The path segments may be fit to a centerline or other part of the path. An optimal fit may reduce any deviation by the path segments from the path. Together, the one or more path segments may form a linear approximation of the path. When the path has been approximated, segmented into, or otherwise represented by path segments, the vehicle path processor 909 may be configured to match subsets of the location data to the segments. In some cases, a location point of the location data may be matched to whichever path segment is closest to the location point. Each location point of the location data may be matched to a single path segment so that a non-overlapping subset of the location data is associated with each path segment (e.g. each location point is only associated with a single path segment).

The aggregator 911 may be implemented by the processor 801 based on instructions stored in the memory 803 of the server 125. The aggregator 911 may be configured to project the location points of the location data onto the aggregation axis. The aggregation axis may be defined as a line perpendicular to a centerline of the path. The aggregator 911 may be configured to project only those location points that remain in the location data. In some cases, location points removed because of density, standard deviation, or in the process of defining a representative point may not be projected. For example, only location points that are not part of the outlier subset of location data may be projected. In some cases, the aggregator 911 may be configured to project the vehicle-common or user-common location points onto a line perpendicular to the centerline of the path.

The aggregator 911 may be configured to group the location points projected onto the aggregation axis into one or more clusters. The aggregator 911 may use a clustering method such as DBSCAN or HDBSCAN to cluster the location data. The aggregator 911 may be configured to generate multiple sets or arrangements of clusters by varying cluster criteria. For example, the neighborhood distance and minimum number of points in a core point neighborhood may be varied by the aggregator 911 to obtain different set or arrangements of clusters. Changing the clustering criteria may result in different location points being grouped into different clusters. In some cases, the cluster criteria may be changed or selected based on input from an input device 703, 807. The aggregator 911 may be configured to perform clustering for each path segment on the subset of location points associated with each path segment.

The geographic data processor 913 may be implemented by the processor 801 based on instructions stored in the memory 803 of the server 125. The geographic data processor 913 may be configured to determine a number of lanes present on a path segment. The number of lanes may range from a single lane to 10 or more lanes. Additionally or alternatively, the orientation of the lanes may be determined. For example, a direction of travel of vehicles, users, or mobile devices contributing to the location data may be used as a direction of travel for the lanes. The geographic data processor 913 may determine the number of lanes based on the number of clusters of location data for the path. For example, where the location data for a path is grouped into three clusters, the geographic data processor 913 may determine that the path has 3 lanes. The geographic data processor 913 may update a record of the path stored in the database 123 with the number of lanes. When multiple cluster sets or arrangements have been generated for a path, the geographic data processor 913 may use the cluster set or arrangement with the least amount of overlap. The geographic data processor 913 may be configured to determine a number of lanes for each path segment of a path. The number of lanes for the whole path may be determined based on the number of lanes for each segment. A "majority vote" of the number of lanes for the path segments may be used to determine the number of lanes for the whole path. For example, where there are five path segments and three segments have been determined to have two lanes, the geographic data processor 913 may determine that the whole path has two lanes.

Figure 10:
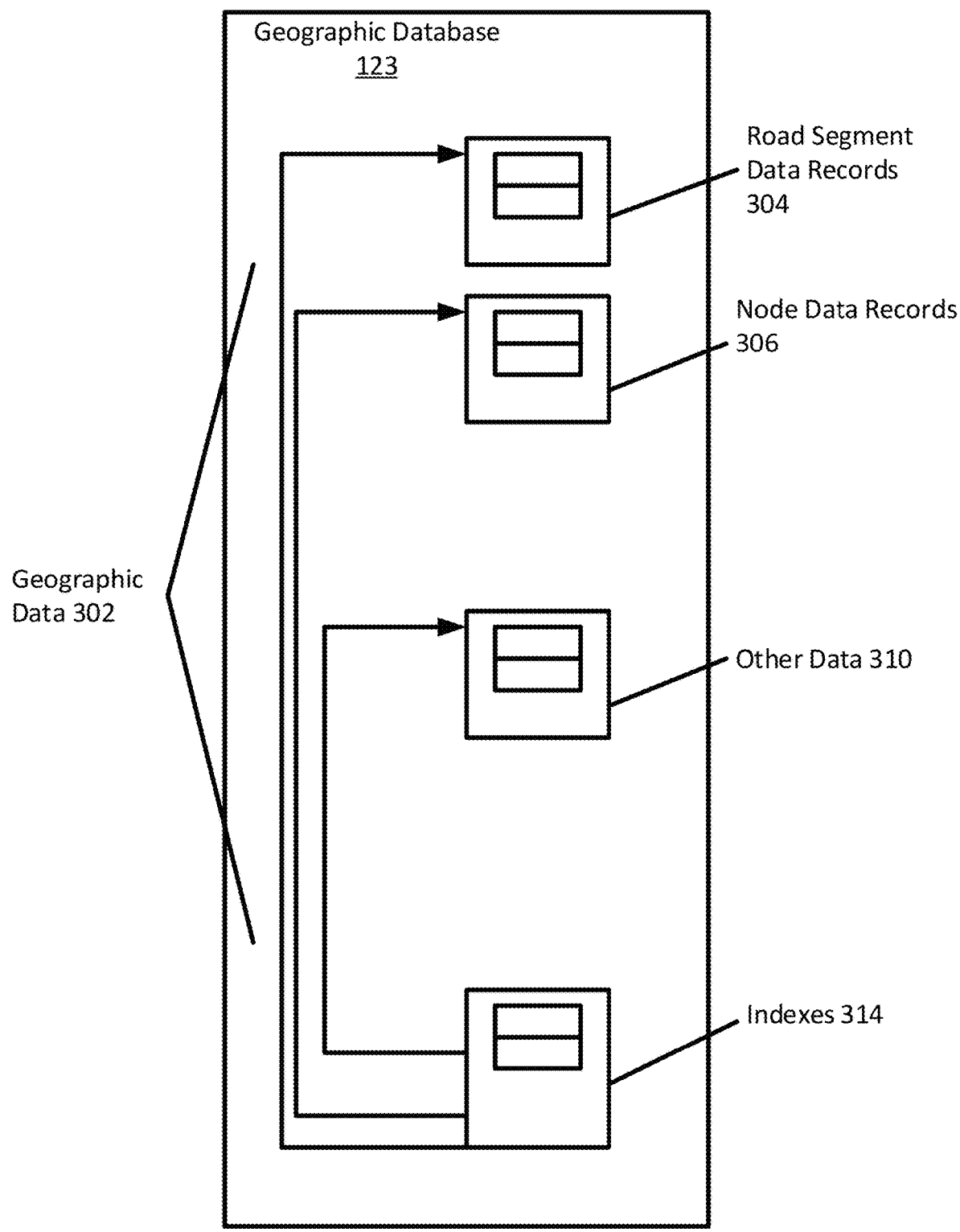
FIGS. 10 and 11 illustrate example geographic databases.

FIG. 10 illustrates an example geographic database. The geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include point of interest (POI) data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 11:
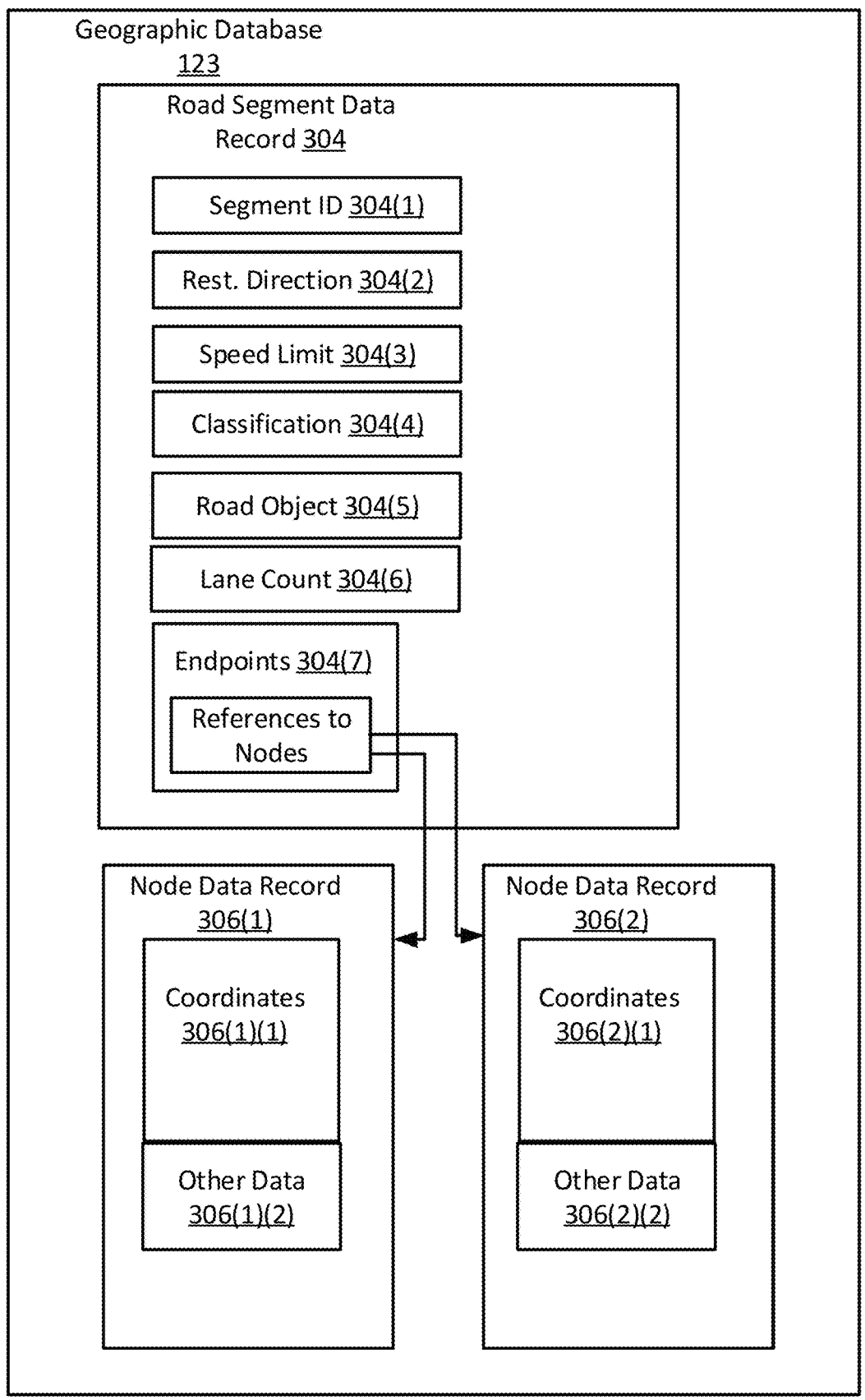

FIG. 11 shows some of the components of a road segment data record 304 contained in the geographic database 123 according to one embodiment. The road segment data record 304 may include a segment ID 304(1) by which the data record can be identified in the geographic database 123. Each road segment data record 304 may have associated information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects 304(5) may be stored using categories such as low, medium, or high. Additional schema may be used to describe the road objects 304(5). The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 may include a lane count 304(6) for the road segment. The lane count 304(6) may be a numerical value indicating the number of lanes of the road segment. The lane count 304(6) may indicate the number of lanes for the whole width of the road segment or for one direction of travel along the road segment. In some cases, the road segment data record 304 includes a lane count 304(6) for each direction of travel along the road segment.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 9 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node. The node data records 306(1) and 306(2) may also include other data 306(1)(2) and 306(2)(2) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used The geographic database 123 and the data stored within the geographic database 123 may be licensed or delivered on-demand. Other navigational services or traffic server providers may access the location fingerprint data, traffic data and/or the lane line object data stored in the geographic database 123.

The mobile device 122, server 125, or processors 701, 801 may include a general processor, digital signal processor, an application specific integrated circuit (ASIC), field programmable gate array (FPGA), analog circuit, digital circuit, combinations thereof, or other now known or later developed processor. The mobile device 122, server 125, or processors 701, 801 may be a single device or combinations of devices, such as associated with a network, distributed processing, or cloud computing.

The memory 709, 803 may be a volatile memory or a non-volatile memory. The memory 709, 803 may include one or more of a read only memory (ROM), random access memory (RAM), a flash memory, an electronic erasable program read only memory (EEPROM), or other type of memory. The memory 709, 803 may be removable from the mobile device 122 or server 125, such as a secure digital (SD) memory card.

The communication interface 705, 805 may include any operable connection. An operable connection may be one in which signals, physical communications, and/or logical communications may be sent and/or received. An operable connection may include a physical interface, an electrical interface, and/or a data interface. The communication interface 705, 805 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 703, 807 may be one or more buttons, keypad, keyboard, mouse, stylus pen, trackball, rocker switch, touch pad, voice recognition circuit, or other device or component for inputting data to the mobile device 122 or server 125. The input device 703, 807 and display 711 may be combined as a touch screen, which may be capacitive or resistive. The display 711 may be a liquid crystal display (LCD) panel, light emitting diode (LED) screen, thin film transistor screen, or another type of display. The output interface of the display 711 may also include audio capabilities, or speakers. In an embodiment, the input device 703, 807 may involve a device having velocity detecting abilities.

The positioning circuitry 713 or a position sensor may include suitable sensing devices that measure the traveling distance, speed, direction, and so on, of the vehicle 124 or mobile device 122. The positioning system may also include a receiver and correlation chip to obtain a GPS signal. Alternatively or additionally, the one or more detectors or sensors may include an accelerometer and/or a magnetic sensor built or embedded into or within the interior of the vehicle 124 or mobile device 122. The accelerometer is operable to detect, recognize, or measure the rate of change of translational and/or rotational movement of the vehicle 124 or mobile device 122. The magnetic sensor, or a compass, is configured to generate data indicative of a heading of the vehicle 124 or mobile device 122. Data from the accelerometer and the magnetic sensor may indicate orientation of the vehicle 124 or mobile device 122. The vehicle 124 or mobile device 122 receive location data from the positioning system. The location data indicates the location of the vehicle 124 or mobile device 122.

The positioning circuitry 713 or a position sensor may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 713 or a position sensor may include suitable sensing devices that measure the traveling distance, speed, direction, and so on, of the vehicle 124 or mobile device 122. The positioning system may also include a receiver and correlation chip to obtain a GPS signal. The vehicle 124 or mobile device 122 receives location data from the positioning system. The location data indicates the location of the vehicle 124 or mobile device 122.

The positioning circuitry 713 or a position sensor may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for assigning a number of vehicle lanes on a vehicle path, the method comprising:
receiving, via a processor, location data including a plurality of location points;
projecting, via the processor, the plurality of location points on to an aggregation axis perpendicular to a centerline of the vehicle path;
grouping, by the processor, the plurality of location points as projected onto the aggregation axis into one or more clusters; and
determining, by the processor, the number of vehicle lanes of the vehicle path based on a count of the one or more clusters.

Embodiment 2

The method of embodiment 1, further comprising:
determining, by the processor, a standard deviation of linear positions of the plurality of location points as projected onto the aggregation axis; and
removing, by the processor, an outlier subset of location points of the plurality of location points based on the standard deviation to define a remainder,
wherein the remainder is grouped into the one or more clusters.

Embodiment 3

The method of any of embodiments 1 and 2, further comprising:
determining, by the processor, a mean of the linear positions of the plurality of location points as projected onto the aggregation axis; and
determining, by the processor, a linear range on the aggregation axis based on the mean and the standard deviation,
wherein the outlier subset of location points includes location points located outside of the linear range.

Embodiment 4

The method of any of embodiments 1-3, further comprising:
fitting, via the processor, one or more linear path segments to a curvature of the vehicle path; and
matching, by the processor, one or more subsets of the location data to each path segment of the one or more linear path segments to define the location data for each linear path segment.

Embodiment 5

The method of any of embodiments 1-4, wherein the number of vehicle lanes of the vehicle path is determined based on a number of lanes determined for a majority of the one or more linear path segments of the vehicle path.

Embodiment 6

The method of any of embodiments 1-5, further comprising:
selecting, by the processor, a representative location point from a subset of vehicle-common location data points of the plurality of location data points; and
removing, by the processor, the plurality of location points other than the representative location point from the location data.

Embodiment 7

The method of any of embodiments 1-6, further comprising:
determining, by the processor, a centroid of the subset of vehicle-common location data points,
wherein the representative location point is selected based on the centroid.

Embodiment 8

The method of any of embodiments 1-6, further comprising:
projecting, by the processor, the subset of vehicle-common location data points onto a line perpendicular to the centerline of the vehicle path;
determining, by the processor, a mean of the subset of vehicle-common location data points as projected onto the line,
wherein the representative location point is selected based on the mean.

Embodiment 9

The method of any of embodiments 1-8, further comprising:
determining, by the processor, a density of the plurality of location points along the aggregation axis; and
removing, by the processor, a subset of location points of the plurality of location points having a density below a threshold density.

Embodiment 10

The method of any of embodiments 1-9, wherein grouping the plurality of location points into the one or more clusters is repeated for each of a plurality of cluster criteria, and the method further comprises:
determining, by the processor, a degree of overlap between the one or more clusters for each grouping according to the plurality of cluster criteria; and
selecting, by the processor, a grouping according to a cluster criterion of the cluster criteria which resulted in a least degree of overlap between the one or more clusters.

Embodiment 11

The method of any of embodiments 1-10, further comprising:
  determining, by the processor, a silhouette coefficient for each location point of the plurality of location points indicating a similarity between each location point and other location points in a respective grouping,
  wherein the grouping is selected for a cluster criterion that maximizes a total silhouette coefficient of the plurality of location points.

Embodiment 12

An apparatus, configured to perform and/or control the method of any of embodiments 1-11 or comprising means for performing and/or controlling any of embodiments 1-11.

Embodiment 13

An apparatus, comprising at least one processor and at least one memory including computer program code for one or more programs, the at least one memory and the computer program code configured to, with the at least one processor, to perform and/or control the method of any of embodiments 1-11.

Embodiment 14

A computer program comprising instructions operable to cause a processor to perform and/or control the method of any of embodiments 1-11, when the computer program is executed on the processor.

We claim:

1. A method for assigning a number of vehicle lanes to a vehicle path, the method comprising:
  receiving, via a processor, a plurality of location points including locations of a plurality of vehicles;
  projecting, via the processor, the plurality of location points on to an aggregation axis;
  grouping, by the processor, the plurality of location points as projected onto the aggregation axis into one or more clusters; and
  determining, by the processor, the number of vehicle lanes based on a count of the one or more clusters.

2. The method of claim 1, further comprising:
  determining, by the processor, a standard deviation of linear positions of the plurality of location points as projected onto the aggregation axis; and
  removing, by the processor, an outlier subset of location points of the plurality of location points based on the standard deviation to define a remainder,
  wherein the remainder is grouped into the one or more clusters.

3. The method of claim 2, further comprising:
  determining, by the processor, a mean of the linear positions of the plurality of location points as projected onto the aggregation axis; and
  determining, by the processor, a linear range on the aggregation axis based on the mean and the standard deviation,
  wherein the outlier subset of location points includes location points located outside of the linear range.

4. The method of claim 1, further comprising:
  fitting, via the processor, one or more linear path segments to the vehicle path; and
  matching, by the processor, a subset of the plurality of location points to each of the one or more linear path segments.

5. The method of claim 4, wherein the number of vehicle lanes of the vehicle path is determined based on a number of lanes of a majority of the one or more linear path segments.

6. The method of claim 1, further comprising:
  selecting, by the processor, a representative location point from a subset of vehicle-common location points of the plurality of location points; and
  removing, by the processor, the subset of location points other than the representative location point from the plurality of location points.

7. The method of claim 6, further comprising:
  determining, by the processor, a centroid of the subset of vehicle-common location points, wherein the representative location point is selected based on the centroid.

8. The method of claim 6, further comprising:
  projecting, by the processor, the subset of vehicle-common location points onto a line perpendicular to a centerline of the vehicle path;
  determining, by the processor, a mean of the subset of vehicle-common location points as projected onto the line,
  wherein the representative location point is selected based on the mean.

9. The method of claim 1, further comprising:
  determining, by the processor, a density of the plurality of location points along the aggregation axis; and
  removing, by the processor, a subset of location points of the plurality of location points having a density below a threshold density.

10. The method of claim 1, wherein the grouping is performed based on a plurality of cluster criteria, and
  wherein the method further comprises:
    determining, by the processor, a degree of overlap between the one or more clusters for each grouping performed based the plurality of cluster criteria; and
    selecting, by the processor, the one or more clusters grouped according to a first cluster criterion of the plurality of cluster criteria with a least degree of overlap between the one or more clusters.

11. The method of claim 10, further comprising:
  determining, by the processor, a silhouette coefficient for the plurality of location points, the silhouette coefficient indicating a similarity between the plurality of location points for each grouping performed based the plurality of cluster criteria,
  wherein the one or more clusters is selected based on a second cluster criterion of the plurality of cluster criteria that maximizes a total silhouette coefficient of the plurality of location points.

12. An apparatus for assigning a number of vehicle lanes to a vehicle path, the apparatus comprising:
  a controller comprising a memory and a processor, the memory storing instructions that, when executed by the processor, are operable to:
    receive a plurality of location points including locations of a plurality of vehicles;
    project the plurality of location points on to an aggregation axis;
    group the plurality of location points as projected onto the aggregation axis into one or more clusters; and
    determine the number of vehicle lanes of the vehicle path based on a count of the one or more clusters.

13. The apparatus of claim 12, wherein the memory stores instructions that, when executed by the processor, are further operable to:
    determine one or more mathematical quantities based on the plurality of location points; and
    remove a portion of the plurality of location points.

14. The apparatus of claim 13, wherein the one or more mathematical quantities includes a standard deviation of linear positions of the plurality of location points as projected onto the aggregation axis,
    wherein the portion of the plurality of location points is an outlier subset of the plurality of location points based on the standard deviation, and
    wherein the memory stores instructions that, when executed by the processor, are further operable to group location points of the plurality of location points not included in the outlier subset into the one or more clusters.

15. The apparatus of claim 14, wherein the one or more mathematical quantities includes a mean of the linear positions of the plurality of location points as projected onto the aggregation axis and a linear range on the aggregation axis based on the mean and the standard deviation, and
    wherein the outlier subset includes location points located outside of the linear range.

16. The apparatus of claim 13, wherein the plurality of location points are recorded by a vehicle of the plurality of vehicles,
    wherein the one or more mathematical quantities includes a centroid of the plurality of location points recorded by the vehicle, and
    wherein the portion of the plurality of location points includes a plurality of location points recorded by the vehicle other than a representative location point, the representative location point being based on the centroid.

17. The apparatus of claim 13, wherein the one or more mathematical quantities includes a density of the plurality of location points along the aggregation axis, and
    wherein the portion of the plurality of location points includes a subset of location points of the plurality of location points having a density below a threshold density.

18. The apparatus of claim 13, wherein the memory stores instructions that, when executed by the processor, are further operable to:
    repeat grouping the plurality of location points as projected onto the aggregation axis into one or more clusters for each of a plurality of cluster criteria, wherein the one or more mathematical quantities includes a degree of overlap between the one or more clusters for each grouping according to the plurality of criteria; and
    select a grouping according to a cluster criterion of the cluster criteria which resulted in a least degree of overlap between the one or more clusters.

19. The apparatus of claim 12, wherein the memory stores instructions that, when executed by the processor, are further operable to:
    fit one or more linear path segments to the vehicle path and match one or more subsets of the plurality of location points to each linear path segment of the one or more linear path segments;
    project the plurality of location points and group location points of the plurality of location points into the one or more clusters for each linear path segment of the one or more linear path segments and for the one or more subsets matched to each respective path segment; and
    determine a number of vehicle lanes for each linear path segment of the one or more linear path segments based on the count of the one or more clusters associated with each linear path segment.

20. A non-transitory computer-readable medium including instructions that when executed are operable to:
    receive a plurality of location points representing a plurality of mobile devices traversing a path in a travel direction;
    fit one or more linear path segments to the path;
    match a subset of the plurality of location points to each of the one or more linear path segments;
    project the plurality of location points on to an aggregation axis of the path;
    group the plurality of location points travel into one or more clusters based on the location points as projected onto the aggregation axis;
    determine a number of traffic lanes and a direction of the path based on a count of the one or more clusters and the travel direction.

* * * * *